United States Patent [19]

Dalmasso

[11] 4,103,328
[45] Jul. 25, 1978

[54] CONTROL APPARATUS FOR CONTROLLING DATA FLOW BETWEEN A CONTROL PROCESSING UNIT AND PERIPHERAL DEVICES

[75] Inventor: Ginette Dalmasso, Bagnolet, France

[73] Assignee: Compagnie Internationale pour l'Informatique Cii-Honeywell Bull (Societe Anonyme), Paris, France

[21] Appl. No.: 566,024

[22] Filed: Apr. 7, 1975

[30] Foreign Application Priority Data

Feb. 20, 1974 [FR] France .................... 74 05792

[51] Int. Cl.² .................. G06F 3/04; G06F 9/16; G06F 13/00
[52] U.S. Cl. .................................................. 364/200
[58] Field of Search ........................... 340/172.5; 364/200 MS File, 900 MS File

[56] References Cited

U.S. PATENT DOCUMENTS

| | | | |
|---|---|---|---|
| 3,564,509 | 2/1971 | Perkins et al. | 340/172.5 |
| 3,579,197 | 5/1971 | Stapleford | 340/172.5 |
| 3,648,252 | 3/1972 | Thron et al. | 340/172.5 |
| 3,689,895 | 9/1972 | Kitamura | 340/172.5 |
| 3,702,462 | 11/1972 | England | 340/172.5 |
| 3,728,693 | 4/1973 | Macker et al. | 340/172.5 |
| 3,742,457 | 6/1973 | Calle et al. | 340/172.5 |
| 3,766,526 | 10/1973 | Buchanan | 340/172.5 |
| 3,801,962 | 4/1974 | Moore et al. | 340/172.5 |
| 3,872,444 | 3/1975 | Cleveland et al. | 340/172.5 |
| 3,909,799 | 9/1975 | Recks et al. | 340/172.5 |
| 3,984,814 | 10/1976 | Bailey, Jr. et al. | 340/172.5 |

*Primary Examiner*—Melvin B. Chapnick
*Attorney, Agent, or Firm*—Cameron, Kerkam, Sutton, Stowell & Stowell

[57] ABSTRACT

A peripheral controller capable of simultaneously handling data transfer microprocesses for several different peripheral devices. The controller includes a set of memories, logic circuits and a physical interface channel for transmitting data between a control processing unit and the peripheral controller and for transmitting data between the peripheral controller and the peripheral devices, an interface control unit for enabling a predetermined one of the peripheral devices to communicate with the peripheral controller, a memory for storing microprograms for controlling the data flow between the control processing unit and the peripheral devices, and a processing circuit for administering the sharing of the processing time of the peripheral controller between the plurality of peripheral devices and the control processing unit.

5 Claims, 14 Drawing Figures

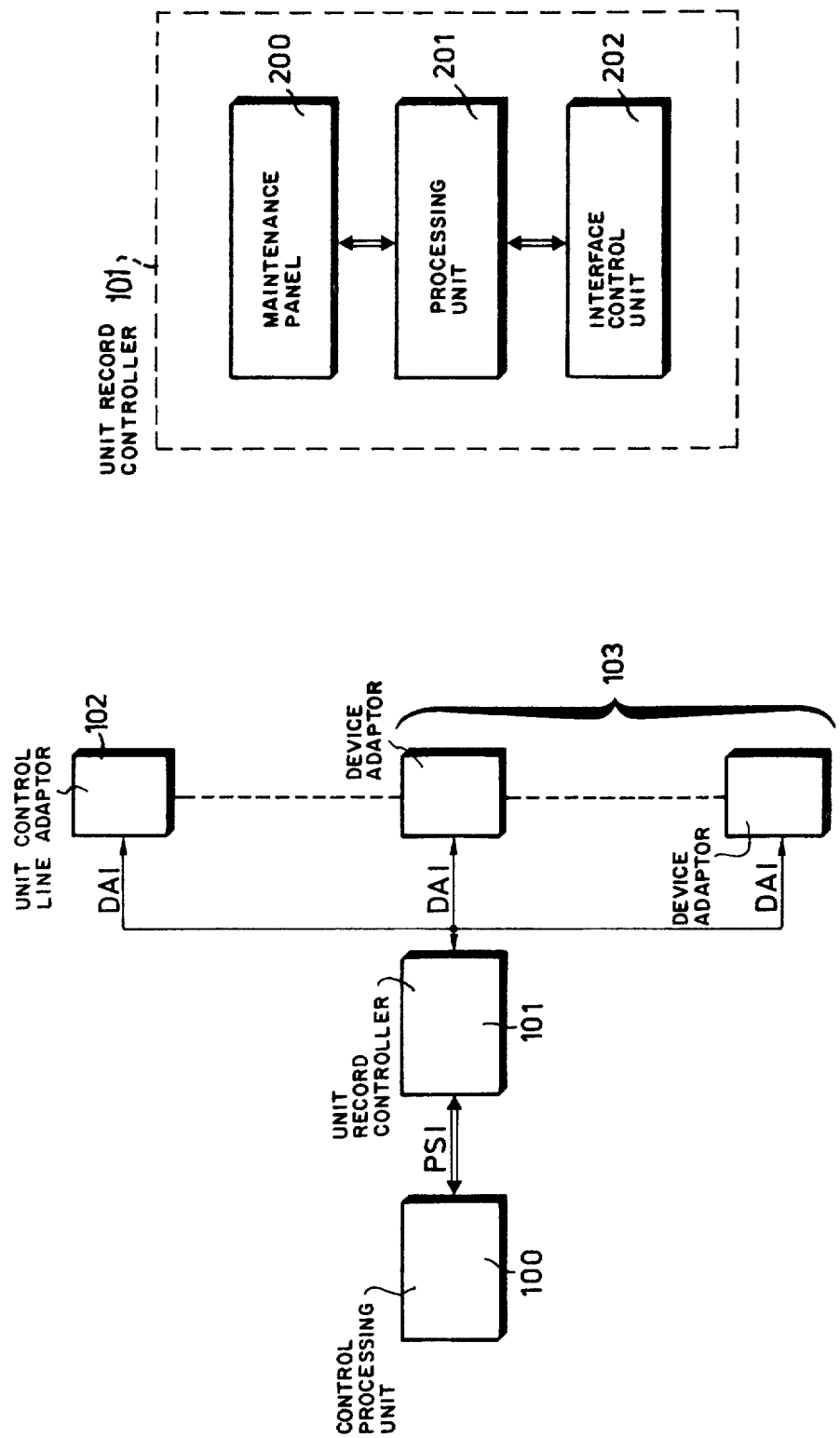

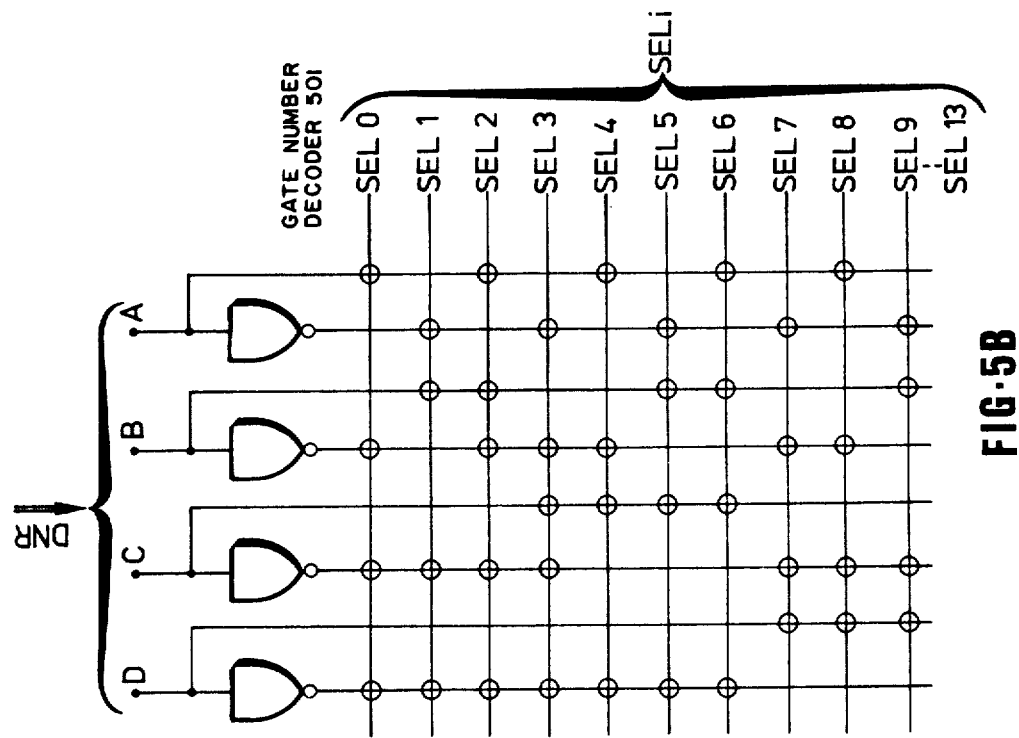
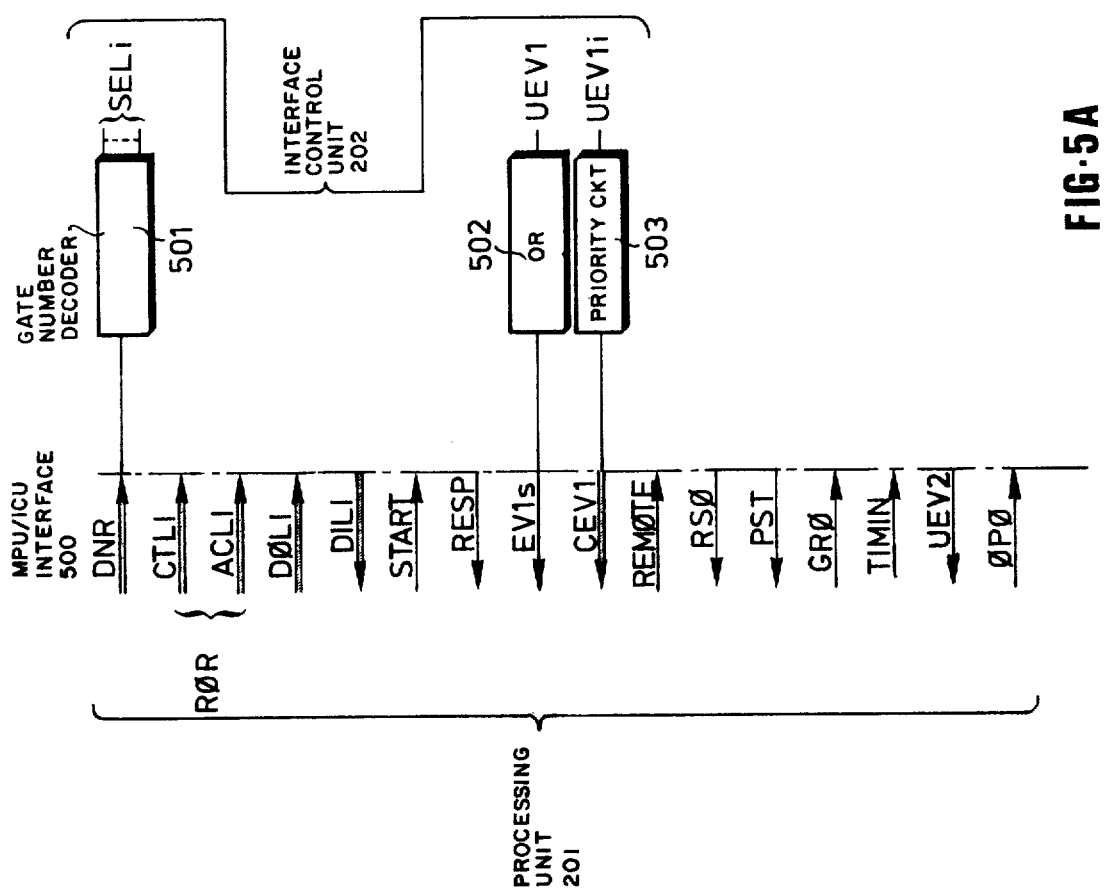
FIG·5B
FIG·5A

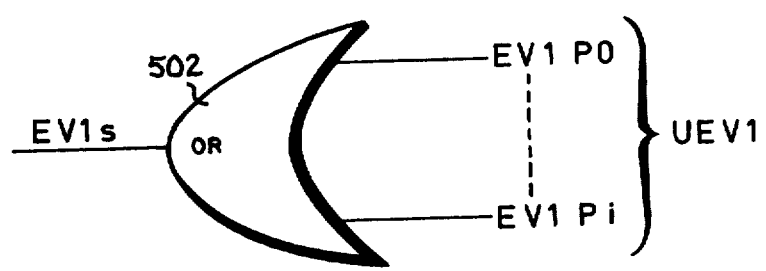
FIG·5C

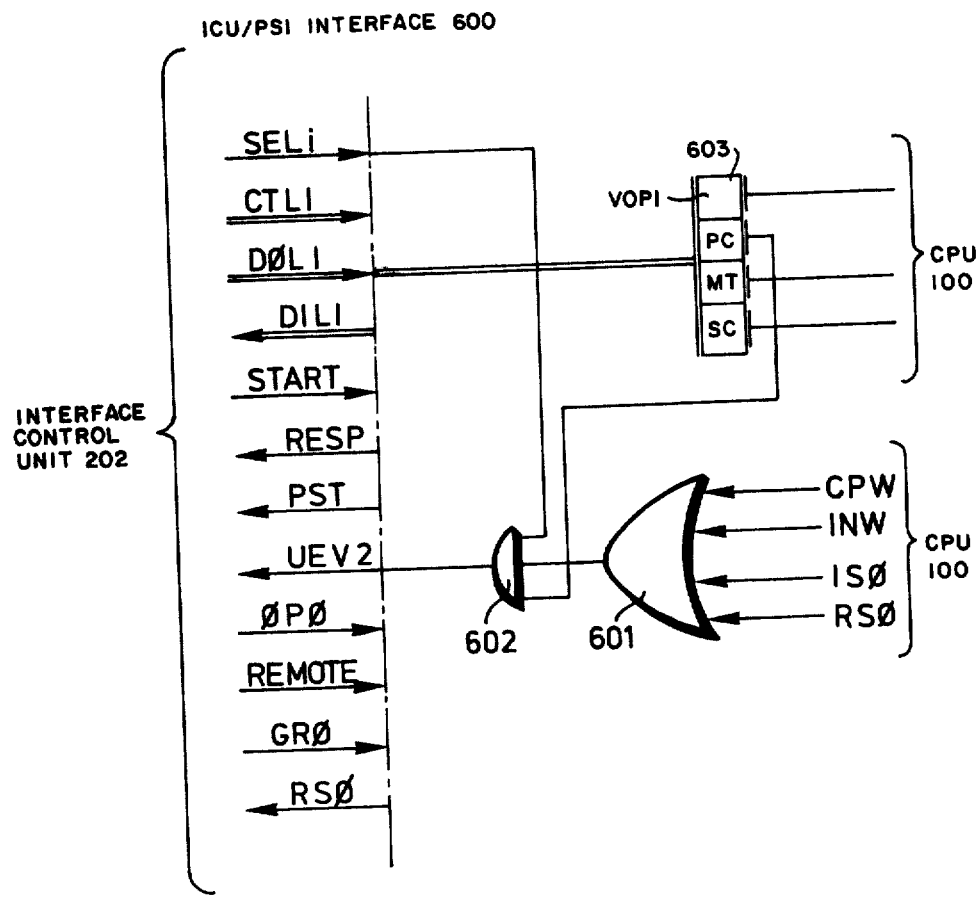
FIG·6A

| CTLI | | | | FUNCTIONS |
|---|---|---|---|---|
| 0 | 1 | 2 | 3 | |
| 1 | 0 | 0 | 1 | WRITE (URC→CPU) |
| 1 | 1 | 0 | 1 | LAST WRITE |
| 1 | 0 | 0 | 0 | READ (CPU→URC) |
| 1 | 1 | 0 | 0 | READ AND TERMINATE |
| 0 | 0 | 1 | 1 | SET PORT FLOPS |
| 0 | 0 | 0 | 1 | WRITE IN REGISTER ROR |
| 0 | 0 | 1 | 0 | READ PORT FLOPS |
| 0 | 1 | 1 | 0 | READ PORT STATE |

FIG·6B

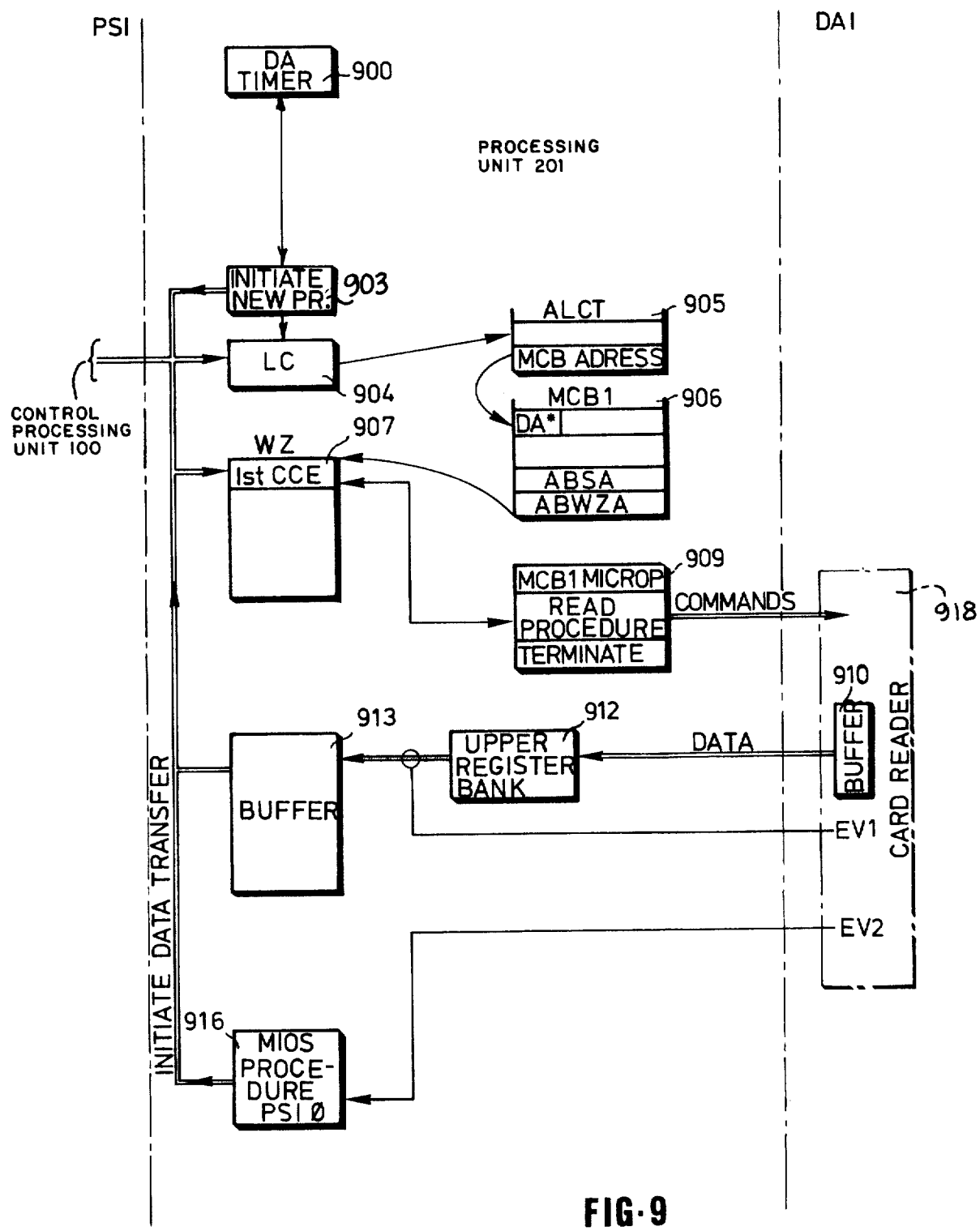
FIG·9

CONTROL APPARATUS FOR CONTROLLING DATA FLOW BETWEEN A CONTROL PROCESSING UNIT AND PERIPHERAL DEVICES

BACKGROUND AND SUMMARY OF THE INVENTION

The present invention relates to the field of processing data by means of computers and more specifically to the field of controllers for controlling a multiplicity of different items of peripheral equipment.

One object of the invention is to provide such a controller which allows microprocesses at the various items of peripheral equipment to be handled simultaneously, thus freeing the operating system of the central unit of tasks such as supervising inputs and outputs and of the necessity to allot resources to control peripheral units.

Another object of the invention is to produce, for each type of peripheral apparatus, "firmware" (see Glossary for definition) in read-only or read/write stores which can easily be changed so as to facilitate the expansion of the peripheral members connected to the controller.

In the techniques generally used to exchange data between a multiprogrammed central processing unit and peripheral apparatus, input/output operations are strung together by a mechanism for linking up interruption procedures, and microprocesses which are ready to be carried out are examined by the operating system. In order to initiate and carry out a microprocess, the operating system needs a certain number of prameters, which it finds either on cards in small systems, or in units for running magnetic tapes, or, in large systems, on the discs in disc-memory units.

Thus, the operating system needs to keep a permanent watch on the state of the peripherals and on the priority levels of the events which appear at each type of peripheral in order to provide the resources which the unoccupied peripheral having the highest priority needs in order to operate. Generally, resources are allotted by calling up the disc or magnetic-tape unit so that the appropriate parameters can be fed into the main memory. When things are so organized, the operating system continuously tests the state of the peripherals, responds to interruptions and starts input/output operations, these opperations taking place to the detriment of other processing which the central unit ought to interrupt. In the case of high performance systems the loss of time becomes a considerable one. Another drawback of known systems is that a special input/output control unit needs to be provided for each type of peripheral apparatus and this generally restricts the extent to which the peripheral apparatus can be expanded, chiefly due to the fact that the hardware cannot normally be developed beyond a certain limit which is imposed by considerations of manufacturing cost.

The controller according to the invention is capable of handling, simultaneously, microprocesses both on communications lines and on items of peripheral apparatus which are usually slow, such as card readers, printers, paper-tape readers or punchers, optical document readers or magnetic cassette-readers, each type of peripheral being connected to a peripheral or device adaptor DA and the connection to the central processing unit being made through a peripheral subsystem interface PSI (see Glossary for definition). To achieve the objects set forth above, the peripheral controller according to the invention is provided with a set of memories and logic circuits the organization of which is such as to endow the controller with the structure of a small general-purpose computer used especially for administering communications between a central unit and a plurality of items of peripheral apparatus.

DESCRIPTION OF THE DRAWINGS

A preferred embodiment of the invention will be better understood from reading the following description with reference to the accompanying drawings in which:

FIG. 1 is a schematic block diagram showing the manner in which a preferred form of peripheral controller mode in accordance with the invention can be connected into an exemplary data processing system;

FIG. 2 is a schematic block diagram illustrating the hardware components of the unit record controller shown in FIG. 1;

FIG. 5A is a schematic diagram illustrating the lines along which signals travel through the MPU/ICU interface which is connected between the processing unit MPU and the interface control unit ICU;

FIG. 5B is a schematic logic diagram showing the gate number decoder 501 illustrated in FIG. 5A;

FIG. 5C shows the OR logic circuit 502 illustrated in FIG. 5A;

FIG. 6A is a schematic diagram illustrating the lines along which signals travel through the ICU/PSI interface which is connected between the interface control unit, and the interface between the central processing unit and the unit record controller, and illustrating the logic elements which are controlled by the first four bits of word OLI at a PSI port;

FIG. 6B is a table showing the meanings of certain combinations formed by word CTLI at a PSI port;

FIG. 9 is a schematic block diagram showing the manner in which a card reader may be connected to a control processing unit via the unit record controller (and in particular, its processing unit) made in accordance with the present invention.

DESCRIPTION OF THE PREFERRED EMBODIMENT

Figure 3:
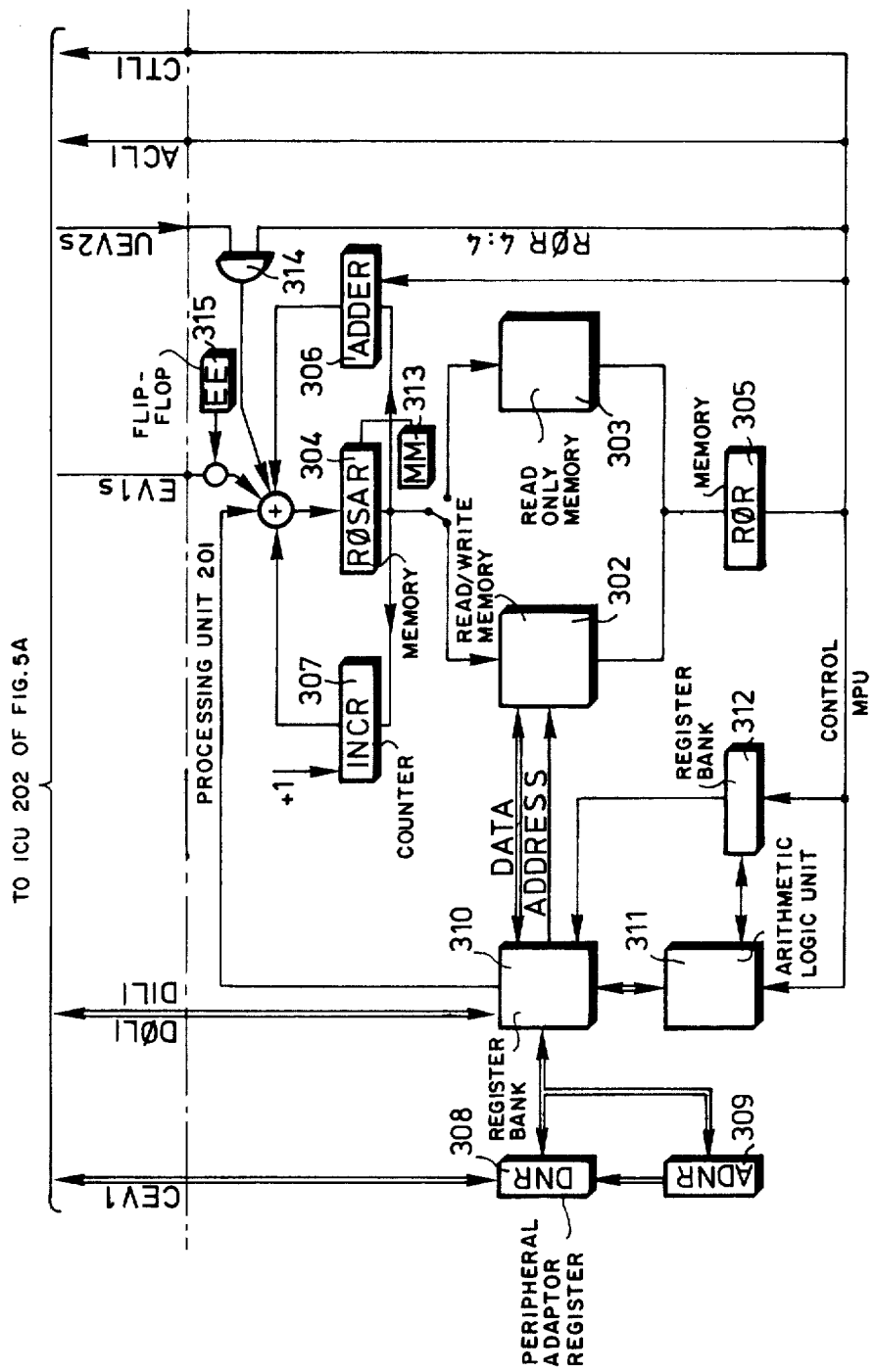
FIG. 3 is a schematic block diagram illustrating the processing unit MPU which is shown diagrammatically in FIG. 2.

FIG. 1 shows a processing system made up of a control processing unit or CPU 100, whic is connected to the peripheral controller or unit record controller URC 101 via interface PSI. All the data which is to be transmitted to an item of peripheral apparatus from the central processing unit 100 passes through interface PSI and the unit record controller 101. Blocks 102 and 103 represent, respectively the unit control line and device adaptors, which are connected to the unit record controller 101 by interfaces marked DAI.

FIG. 2 shows parts of the hardware of the URC 101 in a simplified form. Block 200 represents a maintenance panel, which consists chiefly of switches which are accessible to an operator in order to allow him to perform a certain number of manual tests on the URC 101. Controller block 201 represents the MPU or processing unit of the controller 101 and this is connected on the one hand to the maintenance panel 200 and on the other to the interface control unit or ICU 202, whose job is to direct data passing through the MPU processing unit 201 to different peripheral adaptors 102 or 103.

FIG. 3 shows the structure of the processing unit 201 which is shown schematically in FIG. 1. In FIG. 3, the processing unit 201 is connected to the interface control unit 202. The processing unit 201 is chiefly formed by a read/write memory RWM 302, which has a maximum capacity of 32 kilobytes and a modularity capability of which is 1K words. ROSAR memory 304 allows either a read/write memory 302 or a read only memory 303 to be addressed, depending on the state of MM flip-flop 313, and it contains the address of the next microinstruction. If MM flip-flop 313 is at 1, the next instruction is in read/write memory 302. If the MM flip-flop 313 is at 0, the next instruction is in the read only memory 303. In particular, the flip-flop 313 is connected to a bit position of the ROSAR memory 304, in accordance with the microinstruction address stored therein.

An ROR memory 305 contains the microinstruction which is in course of execution and it controls the various transfers and operations by the processing unit 201 and the interface control unit 202. In particular, it transmits the command words ACLI and CTLI for input-/output operations to the interface control unit 202 and tests bit UEV2s at operator 314. If bit UEV2s = 1, an event EV2 has occurred at a peripheral adaptor or on a physical channel PSI. The UEV2 bit is tested by a conditional branch by microprogram to another address in read/write memory RWM 302 or read only memory 303, the test word or instruction being stored in the ROR memory 305.

An adder ADDER 306 adds the contents of the ROSAR and ROR memories 304 and 305, when an address translation is to be performed on the basis of an original address contained in memory 304 ROSAR and it assists relative branches. Operator INCR 307 is used for address progression inparticular, increments the content of the ROSAR memory 304, i.e. the next addrss, by one unit. Register DNR 308 stores the number of the peripheral adaptor 102 or 103 at which a microprocess is being performed or is to be performed and its content is used to set up a connection for the peripheral adaptor. To set up the connection to the peripheral adaptor register DNR 308 is loaded from a double register band 312, as described in French Patent Application No. 73,38952, filed Oct. 31, 1973, or in the event of an interruption which is caused by the appearance of an event EV1 in one of the peripheral adaptors, it is loaded from a line CEV1, which comes from the ICU. Flip flop EE315 allows EV1 event to be masked temporarily in order not to interrupt the operation which is under way. When a normal task is being carried out, registers DNR 308 and ADNR 309 are loaded simultaneously from double register bank 312. When an interruption occurs and interrupts the microprocess which is under way, register ADNR 309 operates as a register for safeguarding the peripheral adaptor number, and its content allows the interrupted microprocess to be resumed, for which purpose its content is retransferred to register DNR 308. The double register bank 310 is formed by a set of working registers which either allow data DOLI to be transferred to the interface control unit 202 or receive data DOLI from the interface control unit 202 before possible stroage, or allow data to be exchanged with read/write memory 302, or allow data to be exchanged with arithmetic and logic unit 311. The operation and structure of a double register bank is not a part of this invention, per se, and is disclosed in "Automatic Data Process System/360 Edition", by Frederick P. Brooks, Jr. and Kenneth E. Iverson, pp. 43, 157, 158, 161, 163, 185, 198, 240, 259, 296, 368, 402, 403 and 410. Register bank SP 312 is loaded by the arithmetic and ligic unit 311 when a result from operations in the arithmetic and logic unit is zero or when an overflow occurs during operations. It further contains the parameters required to initiate a sub-program with a view to its subsequent loading into the double register bank.

The various operations which are carried out by the processing unit 201 are handled by means of microinstructions, which are loaded either in read/write memory 302 or in read-only memory 303. The format of these microinstructions is always 16 bits long, with the first 4 bits in the format of the microinstruction giving the operation code. The operation code may have one of the following meansings: it may signify logic operations, arithmetic operation registers, logic operations with a constant, the loading of a constant into the register bank, an input/output operation, a read/write operation into or out of store, transfer operations, a conditional or unconditional branch with or without safeguarding, or an absolute branch to a memory area. Logic operations involve "AND", "OR" and "OR EXCLUSIVE" operations with two selected operands which may or may not be stored. The result is placed in one or other of the two operands. The address of the first operand is contained in argument 1 of the format of the microinstruction which defines the logic operation, which argument is contained in bits 4 to 7 of the format. The second opernd is to be found in one or other of registers of the double register bank 310. A complementary code CC contained in the area formed by bits 8 to 11 of the format indicates the nature of the logic operation which is to be carried out.

Arithmetic operations invlove a binary addition or substraction operation on two selected operands which may or may not be stored and the reult is placed in the first or second operand. If there is a report signal, it is always fed to register bank 312. The first operand comes from a selected one of the registers in the double register bank 310 and the second operand comes form both registers in double register bank 310. The address of the first operand is contained in argument 1 of the microinstruction format, which is contained in the area formed by bits 4 to 7, while the complementary code which specified the nature of the arithmetic operation which is to be carried out is contained in the area formed by bits 8 to 12.

The format of a microinstruction which specifies an arithmetic operation with a constant contains, in the area formed by bits 4 to 7, the address Ri of the first operand, with bits 8 to 11 giving the complementary code and bits 12 to 15 giving the value of the constant which is used as the second operand.

The format of a microinstruction which specifies an input/output operation contains, in the area extending from bit 4 to bit 7, complementary code which specifies the nature of the input/output operation which is to be carried out and which includes the word CTLI which is shown in FIG. 3 and transmitted from the ROR memory 305 to the interface control unit 202. In the area extending from bit 8 to bit 15, the microinstruction contains the word ACLI which is transmitted from the ROR memory 305 to interface control unit 202. This microinstruction is used to read or write data from or to a PSI or DAI port or from or to a port of a TIMER 900, s seen in FIGS. 8 and 9. The meanings of CTLI and ATLI will be given later. The data which is transmitted in input/output opertions is contined in the selected one register of the double register bank 310 and the data which is received in input/output operations is fed into the one selected register of the double register bank 310.

Figure 4:
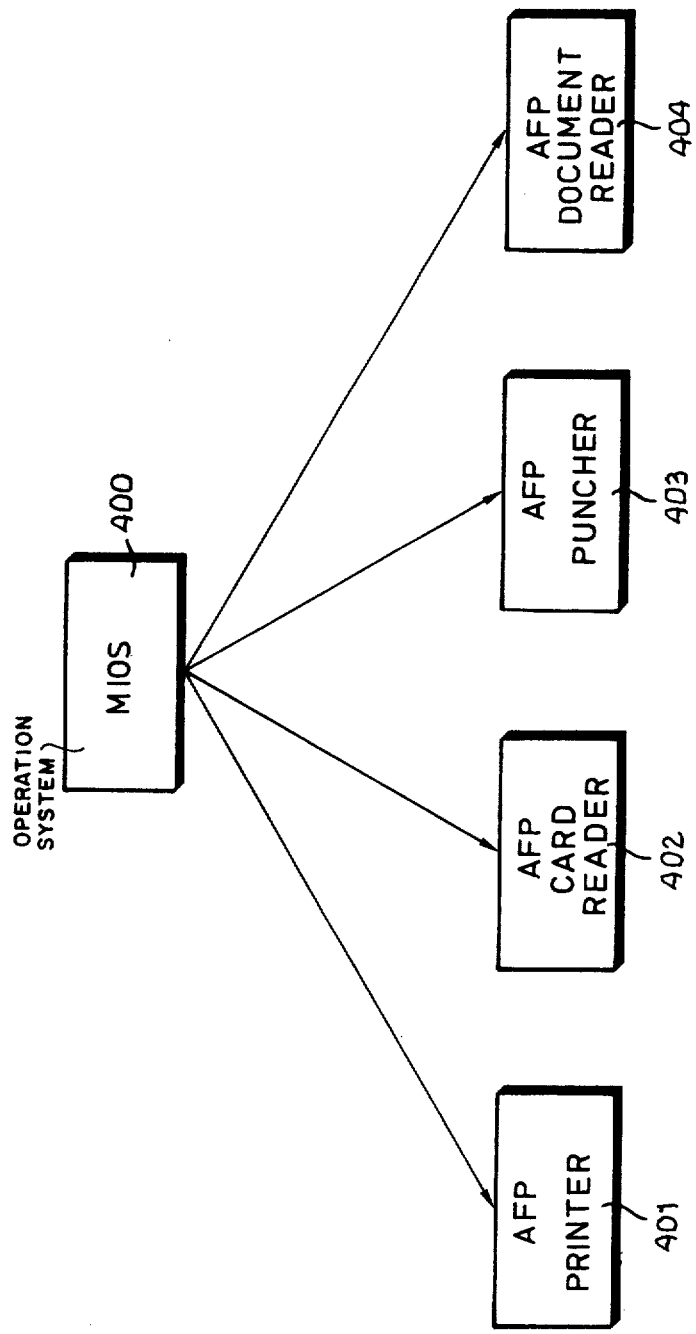
FIG. 4 is a diagram showing how the MIOS or operating system interacts with various ancillaries.

FIG. 4 shows the interactions between the operation system or MIOS 400 and each configuration peculiar to a particular type of peripheral apparatus 401 to 404. The set of microprograms required to conrol a group of items of peripheral apparatus of a sufficiently similar nature is called an AFP microinstruction. In FIG. 4 the MIOS operation system 400 supervises all the types of AFP microinstructions. Microinstruction AFP 401 is a set for a group of printers of the same type; Microinstruction 402 is the set for a group of card readers of the same type; Microinstruction 403 is the set for a group of paper-tape punchers; and Microinstruction 404 is the set for a document reader. The MIOS operation system 400 is made up of a group of functions of which the main ones are time-processing, interruption handling, fetching programs with a view to their execution, and all the operations which are carried out by the control processing unit 100 which forms part of the system.

The MIOS operation system 400 carries out its various functions by means of tables and microinstructions which are located in the readonly memory 303 in FIG. 3.

Each microinstruction AFP is forme by a combination of microprograms and permanent or transient data for controlling a group of peripheral members and it carries out order formulated by the MIOS system 400 and accepts signals produced by the peripheral members.

The MIOS-AFP interface does not form a part of the subject invention, per se, and is well-known in the prior art as illustrated by: 1) *Automatic Data Processing Book*, 1969, p. 200 —"4.16 Interruption and Supervisory Facilities", p. 411 —"8.8 Schedulers", p. 207 — "Input/Output Control Program"; 2) *Microprogramming Principles and Practices*, by Samirs Husson, 1970, pp. 1-20 — "Principles of Microprogramming", pp. 22-76 —"Microprogram Control"; 3) *Computer Organization and the System 370*, by Harry Katzon, 1971, pp. 27, 102, 157 — "Interruption", pp. 103 and 147 —"Input/Output", p. 104 — "Program", pp. 259-264 — "Microprogramming", pp. 140-148 —"I/O Programming"; and 4) *Input/Output Programming and Operation for Operating Systems Survey Book*, by the Contre Corporation, 1971, editor-Anthony P. Sayres, Aucbach Publishers, pp. 17, 21, 34, 54 — "Task Management", p. 23 — "Task Priority", pp. 45 and 47 — "Task Queue", pp. 44 and 48 — "Task Supervisor".

FIG. 5A represents the connections at a MPU/ICU interface 500. Line DNR gives a binary value for the number of the port which is to be selected, signals being transmitted from the processing unit 201 to the interface control unit 202. Line CTLI is activated when an input/output operation is to be carried out and indicates, in binary form, the type of operation which is to be carried out, signals being transmitted from the processing unit 201 to the interface control unit 202. Line ACLI indicates the nature of the data passing through the DAI during the output command sequence of a DAI dialogue, signals being transmitted from the processing unit 201 to the interface control unit 202. Line DOLI transmits data bytes to interfaces DAI or PSI, the signals being transmitted from the processing unit 201 to the interface control unit 202. Line DILI transmits to the processing unit 201 data bytes received from a port which has been selected. The START line transmits a signal from the processing unit 201 to the interface control unit 202 and indicates to the interface control unit 202 that the processing unit 201 is ready to begin an input/output operation. The RESP line transmits a signal from the interface control unit 202 to the processing unit 201 to indicate to the processing unit 201 that the input/output operation orginally started by the START signal is now at an end. Line EV1S transmits a signal from the interface contron unit 202 to the processing unit 201 to indicate that there is at least one unmasked signal EV1 present. Line CEV1 transmits a signal from the interface control unit 202 to the processing unit 201 to give a binary indication to the MPU of the number of the port responsible for an EV1 signal which has the highest priority. The REMOTE line transmits a signal from the processing unit 201 to the interface control unit 202 to indicate to the PSI interface the state of a switch on the maintenance panel 200 which says whether the unit record controller 101 is in the "local" or "remote" mode. Line RSO transmits a signal RSO from the PSI interface to the processing unit 201 and it enables the unit record controller 100 to be reinitialized by placing it in a known state, and, in particular, it allows any dialogue between the unit record controller 100 and the control processing unit 100 to be halted immediately. Line PST transmits a signal from the interface control unit 202 to the processing unit 201 to indicate to the MPU that it is to carry out a relative branch. This signal is only generated by a PSI which hs been selected. Line GRO transmits a reset-to-zero signal from the MPU to the interface control unit 202 in order to place all the logic circuits of the interface control unit 202 and of the interfaces in the quiescent state. The TIMIN line transmits a signal from the processing unit 201 to the interface control unit 202 to mask the signal EV1 coming from a clock 806 of the DA Timer 900 (see FIG. 8), this masking operation being brought about by a switch on the maintenance panel 200. Line UEV2 transmits a signal from the interface control unit 202 to the processing unit 201 to indicate to the processing unit 201 that the signal EV2 from the selected port is present. Line OPO transmits a signal from the the processing unit 201 to the interface control unit 202 to indicate to the interface control unit 202 that the unit record controller 101 is operational.

FIG. 5B shows the gate number decoder 501 from FIG. 5A. In FIG. 5B, the input line DNR contains four leads ABCD each of which is connected on the one hand to the input of an inverter-amplifier and on the other hand to one column of a diode decoding-matrix, the outputs of the inverter-amplifiers being connected to columns of the diode matrix which initialize the complemented state of the signal and the 16 possible combinations appearing on lines SELi. It is clear that if there were n leads in line DNR it would be possible to select 2n ports.

FIG. 5C shows circuit 502 from FIG. 5A which is nothing more than an "OR" circuit, the inputs of which are connected to the group of EV1 lines from the DAI ports. Its output signal is equal to "one" if there is at least one signal EV1 present at the input to the OR circuit 502.

Figure 5D:
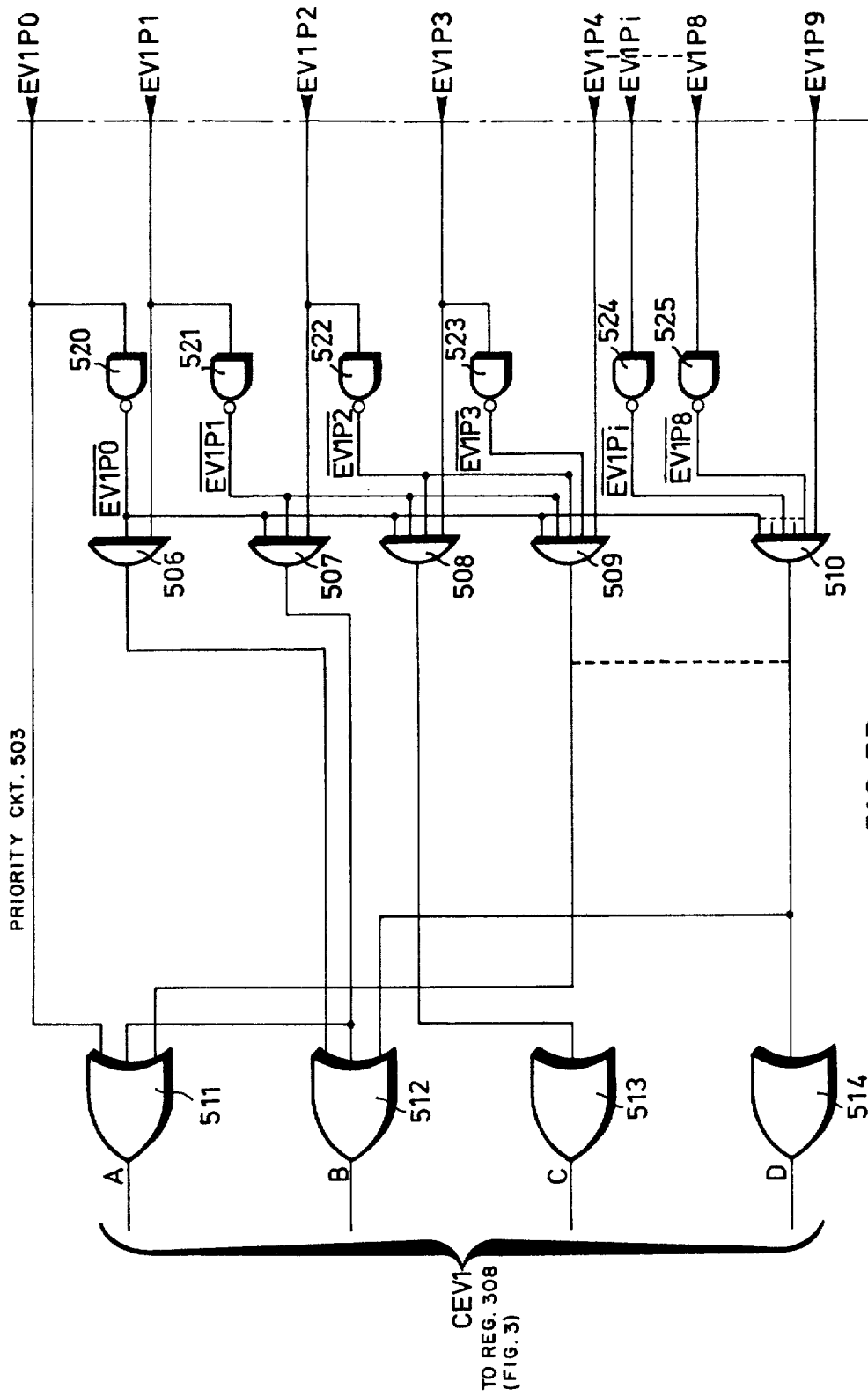
FIG 5D shows the priority circuit 503 illustrated in FIG. 5A.

FIG. 5D shows the details of the priority circuit 503 from FIG. 5A. On the right of the FIG. 5D, the signals marked EV1P0, EV1P1, EV1P2 ... identify each signal EV1 by its port number, with port number zero having the highest priority and priority successively diminishing with the port number. Thus, port number 0 has the highest priority and therefore overrides all the other port numbers. On the other hand, signal EV1P1 from port number 1 does not have priority over signal EV1P0 from port 0 and therefore can be accepted only if signal EV1P0 is not present. The same applies to signal EV1P2 from port number 2, which can be accepted only if signal EV1P0 is absent and signal EV1P1 is also, and so on. The port number of highest priority thus takes the form of a combination of present or absent states on the lines A, B, C, D at the outputs of the OR circuits 511 to 514 and this combination forms the word CEV1 which will be loaded into the peripheral adaptor register 308 in FIG. 3. Each signal EV1Pi has corresponding to it a combination CEV1 = F(DCBA) which in the case of gate number "0" is (0001) in the case of gate number "1" (0010), and so on. The coding used is the natural binary code. AND gates 506 and 510 allow the event EV1 of highest priority to be selected, validation being performed by the signals EV1P0 to EV1P8. Selected of the input signals EV1P0 to EV1P8 are inverted by inverters 520 to 525 before being applied to the AND gates 506 to 510, respectively. From FIG. 5D it can be seen that if a signal EV1P0 is present, it prevents any of the other EV1's from being coded since EV1P0 = 0 at the input to all the gates 506 to 510. On the other hand, if EV1P0 = 0 and EV1P1 = 1, gate 506 alone is validated since EV1P0 = 1 and EV1P1 = 0 at the inputs to gates 507 to 510. The same process of logic applies in the case of all the other gates 507 to 510. Each of the outputs of gates 506 to 510 are connected to inputs of "OR" circuits 511 to 514 which, when any such output goes to 1, become directly involved to produce the coding F(ABCD) for the priority event. It is obvious that this method of coding may be applied to n EV1 events.

Returning to FIG. 5A, all signals other than DNR, EV1S, CEV1 pass through the interface control unit 202 unaltered.

FIG. 6A shows the communications lines between the interface control unit 202 and interface. Line SELi transmits a signal from the interface control unit 202 to the PSI to select a PSI port. Line CTLI transmits command words between the interface control unit 202 and the PSI and is active when an input/output operation is being carried out. It indicates the sub-type of operation which is to be carried out at the PSI. The principal command words are shown in the table in FIG. 6B. Line DOLI transmits the data bytes which are to be written at the PSI port. Line DILI transmits the data bytes which are to be read from PSI port. The START line signals to the PSI port that is to initiate an input/output operation. The RESP line signals indicate to the processing unit 201 that an input/output operation which was previously started by means of the START signal is now concluded. Line PST signals to the processing unit 201 via the interface control unit 202 that it is to make a relative branch. This signal is only generated by the PSI port selected during an input/output operation. Line UEV2 signals to the interface control unit 202 that at least one signal of those listed below is present at the selected PSI port, it being possible for signal UEV2 to appear only if signal SELi is present at the input to AND gate 602.

The nature of, and the operations launched by these signals between the unit record controller 101 and the control processing unit 100 are described in a French Patent Application No. 73 42714, the inventors of which were Messrs. Bienvenu, Ferdmann and Verdier, and which was filed Nov. 30, 1973 and in the corresponding U.S. Application Ser. No. 527,758 entitled "Computer Interface Method and Apparatus", filed Nov. 27, 1974, now abandoned. These applications are incorporated by reference.

The signals concerned are the following:

CPW means that a channel program is waiting in the control processing unit 100.

INW means that an instruction is waiting in the control processing unit 100.

ISO means that an error has been detected in the transfer sequence.

RSO reinitializes the unit record controller 101.

The OR circuit 601 in FIG. 6A represents the following condition: UEV2 = CPW + INW + ISO + RSO.

Line OPO indicates that the unit record controller 101 is operational.

The REMOTE line indicates whether the unit record controller 101 is in the local or remote mode and represents the state of the "local" or "remote" switch on the maintenance panel 200.

Line GRO is used to reset the logic circuits of the port PSI to zero.

Line RSO signals to the processing unit 201 that an RSO signal coming from the PSI is present at the PSI port.

FIG. 6A further shows the logic elements and in particular, an array 603 of flip-flops which are controlled by the first four bits of word DOLI. They either report the transmission of the service code to the control processing unit 100 by setting flip-flop SC of the array 603 to logic 1, or cause signal from flip-flop MT to be transmitted to the control processing unit 100, this flip-flop being at 1 whenever the unit record controller 101 is carrying out a channel program, or cause the PSI port to be connected to interface control unit 202 by setting flip-flop PC to logic 1, or transmit a signal CPI, which means that the unit record controller 101 ia operational, to the control procesing unit 100 by setting flip-flop VOPI to logic 1.

Figures 7A, 7B:
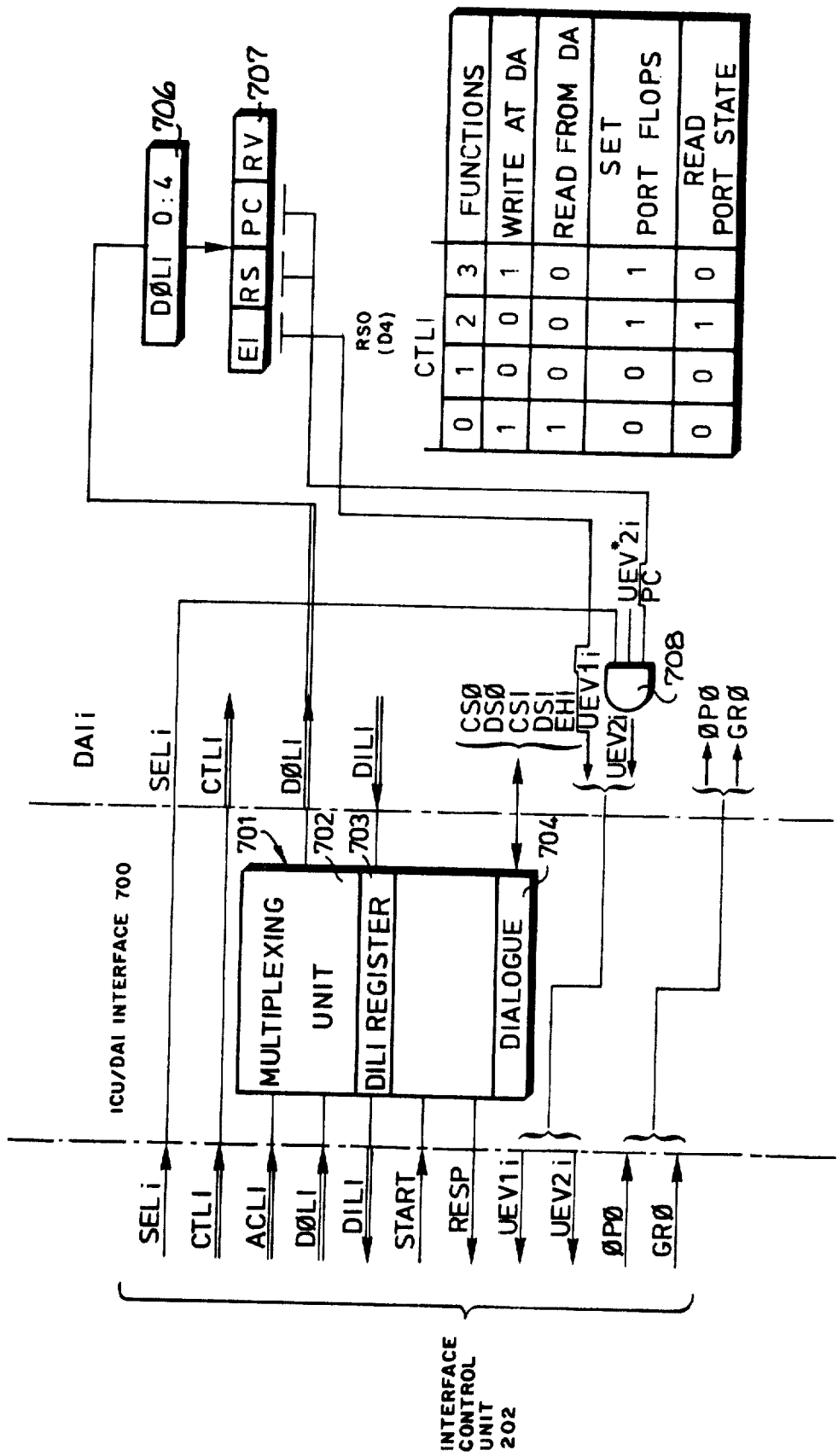
FIG. 7A is a schematic diagram illustrating the signals which pass along the lines of the ICU/DAI interface which is connected between the interface control unit and the DAI between the unit record controller and a peripheral (unit control or device), and illustrating the logic elements which are controlled by the first four bits of word DOLI at a port DAI.
FIG. 7B is a table showing the meanings of certain combinations formed by word CTLI at a port DAI.

FIG. 7A shows the transmission lines interface control unit 202 between the or ICU/DAI interface 700 and a, DAIi and includes a logic system 701 made up of a multiplexing unit 702 whose job is to address the incoming or outgoing data items DOLI, ACLI and DILI to the interface control unit 202 as a function of the DA device adaptor 103 for which they are intended or from which they have come. Register 703 serves as a buffer for DILI data. Exchanges between the interface control unit 202 and a DAI are set in motion by the START signal and are halted by the RESP signal. The data is then switched in the device adaptor 103 by the address signal ACLI, the signal ACLI also indicating ot the device adaptor 103 the direction of transfer of the data.

Block 704 contains all the elements required to synchronize exchanges at interface DAI between the unit record controller 101 and a peripheral adaptor 103. This dialogue already forms the subject of French Patent No. 73 31760, filed Sept. 3, 1973 by Compagnie Honeywell Bull, the corresponding U.S. Application Ser. No. 500,994, entitled "Method and device for control of the transmission of data exchanged between a control processor and a plurality of peripheral devices" filed on Aug. 27, 1974 in the name of Mr. Mazier. These applications are incorporated by reference.

Line SELi carries the signal for selecting a port DAIi. Lin CTLI indicates the type of operation which is to take place at the DAI port, the main operations being shown in the table in FIG. 7B. Lines UEV1i and UEV2i signal to the interface control unit 202 that an event EV1 of priority 1 or an event EV2 of priority 2 has arrived at the peripheral adaptor 103. Signals OPO and GRO have the same meanings in the case of an ICU/DAI interface 700 as they have in the case of an ICU/PSI interface.

FIG. 7A further shows the circuits of a port DAIi 706 which are controlled by the first four bits of word DOLI. EI is a flip-flop of an array 707, which causes signal UEV1 to be transmitted to the interface control unit 202, if an EV1 is present at the corresponding device adaptor 103; RS is a flip-flop which causes signal RSO to be transmitted to the device adaptor 103 and halts any dialogue at the device adaptor 103, and PC and RV are flip-flops which cause the port to be connected to the interface control unit 202. If RV euqals 0, the unit record controller 101 no longer requires the use of the circuitry-established communication path between the device adaptor 103 and the unit record controller 101, and switching the device adaptor 103 is therefore allowed for free-standing switches located between the device adaptor 103 and the unit record controller 101. IF RV equals 1, the DAI interface has been seized and therefore no switching on the device adaptor 103 is allowed.

Figure 8:
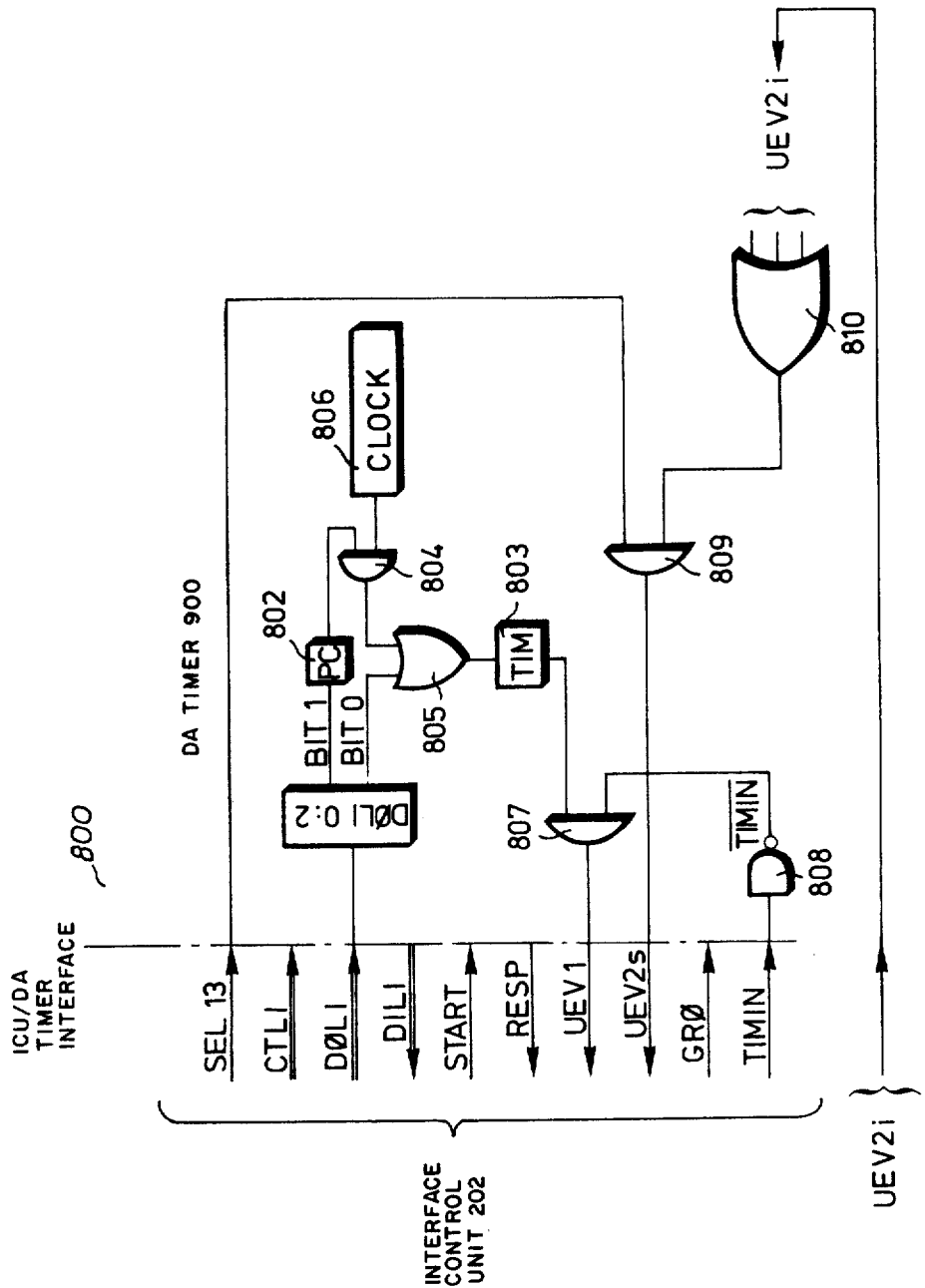
FIG. 8 is a schematic diagram showing the signals which pass along the lines of the ICU-TIMER interface which is connected between the interface control unit ICU and the clock which supplies an interruption signal termed by EV1 TIMER signal.

FIG. 8 shows the ICU/TIMER interface 800. The role of the device adaptor DA TIMER 900 apparatus is to provide a signal pulse each millisecond by means of the clock 806, the signal being stored in a flip-flop TIM 803 and appearing in the form of an interruption TIMER signal UEV1 from AND gate 807. Signal UEV1 is used in the processing unit 201 on the one hand to update the various queues of waiting microprocesses every millisecond and on the other hand, when an event which ought to have taken place at a device adaptor 103 has failed to arrive within the allotted time, to produce an interruption to the microprocess which is being carried out at the device adaptor 103, to isolate the device adaptor 103 and to give over the processor time to a microprocess. The various procedures which are initiated by signal UEV1 as disclosed in the above identified references entitled *Automatic Data Processing Book; Microprogramming Principles and Practices; Computer Organization and the System* 370; and *Operating Systems Survey Book*. When an incident occurs at the device adaptor 103, bit 0 of word DOLI is set to 1 by FIRMWARE as described in U.S. Patent Application No. 566,025, and is stored in flip-flop TIM 803 via OR circuit 805. Thus, OR circuit 805 sets the TIM flip-flop either by means of bit 0 of word DOLI, or every millisecond by means of clock 806 via AND circuit 804. The clock signals can be validated only if the TIMER port is connected. A connection is formal whenever bit 1 of word DOLI is a logic 1; this bit is stored in flip-flip PC 802, which therefore validates the signal from clock 806 via AND gate 804 and signal UEV1 via AND gate 807. As a result of the actuation of a switch on the maintenance panel 200, signal UEV1 may be masked by the appearance of signal TIMIN at the input to inverter amplifier 808, the result of which is to cause logic zero to appear at the input to AND gate 807. The TIMER port has been given the number 13, and, when line SEL13 is selected by the decoder in FIG. 5B, it validates that input to AND gate 809 which is connected to the output of the OR circuit 810 at the input which appear the signals UEV2i from all the DAI and PSI gates. When there is at least one signal UEV2i present, it causes a signal UEV2S to appear when line SEL13 is selected. This signal UEV2S thus appears at the input to operator 314, as described above in FIG. 3. The line CTLI is used to read the state of the flip-flops or to allow the flip-flop in the TIMER port to be set. The flip-flops states or write bits are conveyed along line DILI. The lines START, GRO and RESP perform the same functions as their counterparts at the other interfaces.

FIG. 9 shows an example of the connection between the control processing unti 100 and a peripheral, which in this case is a card reader 918.

The DA TIMER 900 emits a signal along line UEV1 of FIG. 8. This signal UEV1 is obtained from the clock 806 contained in the TIMER 900 of FIG. 8, which gives uniformly spaced pulses. This signal EUV1 is processed by the priority circuit 503 in FIGS. 5A and 5D, and appears, in the form of a four bit binary word CEV1 signifying the number of the TIMER port, at the output of OR circuits 511 to 514.

Signal UEV1 is also transmitted to the OR circuit 502 of FIGS. 5A and 5C in order to be converted into a signal EV1S which is to be transmitted to the processing unit 201 shown in FIG. 3 and which will result in an interruption to the microprogram which is currently being carried out, in the number of the TIMER port (CEV1) being fed into the peripheral adaptor register 308 (the number of the port through which was taking place the processing which was interrupted remains stored in the stored ADNR register 309), in a flip-flop for selecting the upper register bank being set (the processing which was interrupted having employed the lower bank), and in certain auxiliary registers in areas of the read write memory 302 being safeguarded.

The content of the peripheral adaptor register 308 is then fed into the double register bank 310 and allows the initial address of a MIOS procedure to be calculated, the EV1 having first being used to count time, the procedure consisting in checking whether there is a microprogram from an instruction waiting which has a higher priorty than that which was currently being carried out.

This search corresponds to stage 901 in FIG. 9 and the MIOS looks for any signal EV2 which there may be. If there is a signal EV2, it is present on line UEV2 at the input to AND circuit 314 in FIG. 3, and it is tested by a microinstruction from the ROR memory 305. To carry out this test, the MIOS successively increments the content of register the peripheral adaptor register 308 in single units from value 0 to value $2^4$ and on each occasion its content is decoded the gate number decoder 501 of FIG. 5A, an embodiment of which is shown in FIG. 5B. Each value of the contents stored in the peripheral adaptor register 308 has a corresponding value SELi for validating a signal UEV2i at the DAI or PSI ports and so, when signal UEV2 at the input to AND gate 314 assumes the value "one", this means that an event EV2 has occured at that DAI or PSI port whose number corresponds to the content of the peripheral adaptor register 308.

In the example in FIG. 9, a signal UEV 2 corresponds to an event which has occurred in the control processing unit 100. It appears at a PSI port at the OR circuit 601 in FIG. 6A. The processing unit 201 replies from stage 903 in FIG. 9 with a code for initiating a new program. For this it first applies the code 0011 for word CTLI to the PSI port in order to set up the connection required to announce to the control processing unit 100 that a service code has been transmitted, and then code 1001 in order to transmit the code to the control processing unit 100, the code being a request to initiate a new channel program, shown in FIGS. 6A and 6C. From stage 904 in FIG. 9, the control processing unit 100 responds by transmitting along line DILI of the PSI port a code signifying a logic channel number LC together with the first CCE instruction contained in the channel program from the control processing unit 100, which instruction signifies the nature of the operation which is to be carried out. This code is transferred to the read/write memory RWM 302 in FIG. 3. The LC number serves as a basis for calculating the address of an entry in a table ALCT 905 in the read/write store RWM 302 in FIG. 3 in which is situated the address of a job control block MCB1 906 in which is the number of the DAI port at which the operation is to take place, as well as the address ABWZA of the working zone WZ 907 and the initial address for a microprocess MCB1 from the AFT instruction associated with this port. The first instruction CCE is directed to working zone 907 (if there are no microprocesses of higher priority waiting). The first microinstruction MCB1 909 in microprocess ABSA reads the content of the first CCE in working zone WZ. In the example in FIG. 9, the first CCE causes data recorded on a punched card to be read in the card reader, the reading command being handled by a microprogram from the AFP for the card reader which breaks it down into basic orders which are transmitted to the adapter device 103 for the card reader (feed-in orders to engage the card which was in the magazine into the reading station, etc.). Then, when this microprogram has been completed, while waiting for the data actually to be read, the MIOS resumes control of the URC, looks for waiting microprocesses, and sets in operation that one of them which is of highest priority.

Then, when the first column of the card is read, its content is transferred into the buffer 910 associated with the card reader and the end of this transfer is marked by the appearance of a signal UEV1 at the DAI port which corresponds to this card reader. This signal EUV1 is transmitted to the MPU in FIG. 3 in the form of a signal EV18 which will give rise to an interruption to the running microprogram and will initiate a microprogram EV1 which will allow the data to be transferred from buffer 910 into a zone of buffer store 913 which is located in the read/write memory 302 in FIG. 3, passing through the upper bank of the double register bank RB 310 in FIG. 3, which is marked 912 in FIG. 9. When microprogram EV1 has been completed, the MIOS resumes control of the URC and runs a further microprogram until the second column on the card has been read, at which time a further process identical to that just described takes place, and so on until the last column of the card is read, and which the card reader emits a signal EV2 and, when all the signals EV2 have been tested by the MIOS, causes a fresh scan to be made through all the lines UEV2 associated with all the DAI and PSI ports for the possible initiation of a priority microprogram EV2. When signal EV2 from the card reader obtains priority, the end of card microprogram is launched by means of a microinstruction PSIO which causes a code for initiating a transfer of data to be transferred to stage 916. Microinstructions P510, such as are stored in stage 916 may be implemented in a manner similar to the form of a channel program of an IBM 360, as described at p. 207 of "Automatic Data Processing System/360 Edition", by Frederick P. Brooks, Jr. and Kenneth E. Inverson, and at p. 140, "I/O Programming" of *Computer Organization and the System* 370, by Harry Katzon (Van Nostrand Reinhold). The data contained in the data buffer 913 is then transferred to the control processing unit line DOLI, the connection being formed as a result of the states 1001 which appear on line CTLI.

The description just given of the hardware/firmware apparatus in a preferred embodiment of the invention is only one aspect of possible embodiments and it is clear that a person skilled in the art of computers could conceive of some other embodiment, without thereby departing from the scope of the invention.

| GLOSSARY | |
|---|---|
| Software | The set of means provided to allow a computer to be used, formed essentially by programs of various kinds. |
| Firmware | An arrangement formed in essence by a non-erasable or permanent memory and its associated circuits which is used to store microprograms for the purpose of controlling functions intended for carrying out instructions in the program or repetitive functions such as the control of peripheral units. |
| Hardware | Encompasses all the physical components of the computer whatever apparatus, member or device is used. |
| BIT | Refers to a binary digit. |
| BYTE | Refers to a binary digit made up of a plurality of BITS. |
| DA | Abbreviation of the term "Device adaptor" |
| DAI | Abbreviation of the term "Device adaptor interface" |
| PSI | Abbreviation of the term "Peripheral sub-system interface"; refers to an interface between the peripheral control unit and the input/output controller of the central unit. |
| MPU | Abbreviation of the term "Multiprocessing peripheral unit", which is a multiprogrammed unit for controlling peripherals. |
| ICU | Abbreviation of the term "Interface control unit", refers to an interface between the MPU and various PSI and DAI interfaces. |
| URC | Abbreviation of the term "Unit record controller", the peripheral functions of which are to control operations carried out at the peripherals. |
| Microprocess | A series of Microprogrammed operations which, when carried out, produce the effect of a sequence of microinstructions having been carried out non-simultaneously |
| Channel Program | A set of instructions and address information, the purpose of which is |

GLOSSARY (continued)

| | |
|---|---|
| | to perform an input/output operation between the central unit and its peripherals. |
| CCE | Abbreviation of the term "channel command entry"; refers to the basic structure in a channel program. |
| Logic Channel | The method of access used to carry out an input/output operation between the central unit and a peripheral is called a channel. A channel is formed by a physical channel made up of the "Hardware", resources used to connect the input/output controller of the central unit to the peripheral and/or a logic channel which comprises all the means required to carry out an input/output operation. The input/output operation is defined by a channel program. The logic channel can have only one channel program active at any one time. Logic channel numbers are used by the channel to switch between different points for storing the required parameters and to maintain a number of channel programs under execution simultaneously. From the software point of view peripherals are identified by an input/output controller number, a physical channel number and a logic channel number. One channel program is assigned to each peripheral. The peripherals are assigned logic channel numbers for configuration periods of the system or when a peripheral is added to it. There may be more than one logic channel per peripheral. The logic channel may be considered active from the moment when the channel program is initiated by a "software" instruction, until it has been completed. |
| Processor | The part of the computer where processing takes place and which contains the control members and arithmetic and logic calculating members. |

What I claim is:

1. In a data processing system, a peripheral control apparatus for controlling the flow of data between a control processing unit and a plurality of peripheral devices, said peripheral control apparatus comprising:
   1. interface channel means coupled to said control processing unit and to the plurality of peripheral devices for transmitting data between said peripheral control apparatus, said control processing unit and said plurality of peripheral devices;
   2. interface control means coupled to said interface channel means for enabling a predetermined one of said plurality of peripheral devices or said control processing unit to communicate with said peripheral control apparatus;
   3. memory means coupled to said interface control means for storing microprograms for controlling the data flow between said control processing unit and said one peripheral device, and for storing data derived from the said interface control means; and
   4. processing means connected to said memory means and said interface control means for administering the sharing of processing time of said peripheral control apparatus between said plurality of peripheral devices and said control processing unit, and for processing data derived from said interface control means.

2. Peripheral control apparatus according to claim 1, wherein said interface control unit means comprises:
   1. multiplexing unit means for exchanging data and orders between said processing means and each of said peripheral devices;
   2. first interface means operatively connected to said control processing unit and said plurality of peripheral devices, including:
      a. first means for connecting each of said peripheral devices and said control processing unit;
      b. second means for indicating the type of operation which is to take place at a selected peripheral device; and
      c. third means for indicating that an event has occured at said selected peripheral device;
   3. second interface means operatively connected to said processing means and to said control processing unit, including:
      a. fourth means for connecting said control processing unit to said processing means;
      b. fifth means for indicating the type of operation which is to be performed by said second interface means;
      c. sixth means for indicating that an event has occured at said control processing unit; and
      d. seventh means for transmitting data between said control processing unit and said peripheral control apparatus under control of said processing means; and
   4. third interface means operatively connected to timer means for periodically providing an interruption signal for allowing priority data transmission of microprocess signals to said interface channel means by said processing means.

3. Peripheral control apparatus according to claim 2, wherein said first interface means comprises:
   decoder means for decoding a channel number representing a physical channel along which communications are to take place;
   logic circuit means for reporting that an event of high priority has just occurred at one of said peripheral devices;
   means for identifying said peripheral devices at which the high priority event has occurred;
   control line means for indicating the type of input/output operation to be carried out and the nature of the data to be transmitted; and
   transfer line means for transferring state signal from said processing means and for synchronizing exchanges.

4. Peripheral control apparatus according to claim 3, wherein said means for identifying comprises:
   means for assigning ascending numerical serial numbers to each of said peripheral devices; and
   combinatory logic circuit means for giving priority to said peripheral device where the high priority event has occurred whose serial number is lowest.

5. Peripheral control apparatus according to claim 2, wherein said interface control unit means further comprises:
   first line means for synchronizing exchanges of data on said interface channel means;
   CTLI line means for indicating to one of said peripheral devices or to said control processing unit the nature of the dialogue which is to be carried out on said interface channel means;
   DOLI line means for conveying data to one of said peripheral devices or to said control processing unit;
   FILI line means for conveying to said processing means data from said peripheral devices or from said control processing unit; and
   a set of line means for reporting events of high priority which have occurred at said peripheral devices or events of a lower priority which have occurred at said peripheral devices or at said control processing unit.

* * * * *